74157
G.W. & C.L. Sherman's Comb'd Flour Sifter & Scoop.
PATENTED
FEB 4 1868
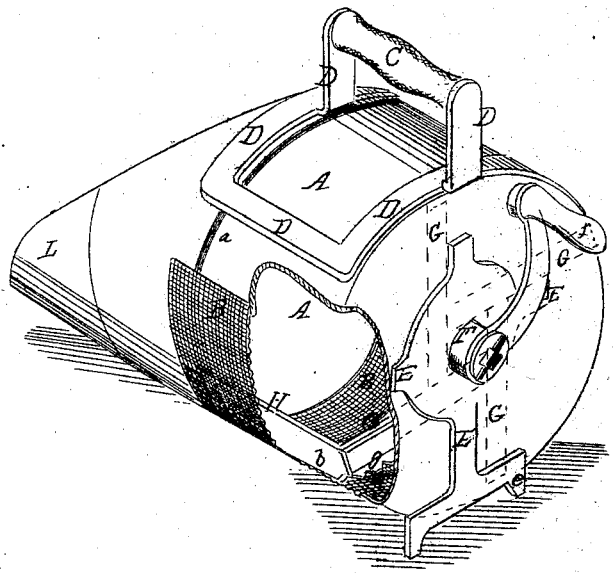

United States Patent Office.

GEORGE W. SHERMAN AND CHARLES L. SHERMAN, OF SEYMOUR, CONNECTICUT.

Letters Patent No. 74,157, dated February 4, 1868.

IMPROVED FLOUR-SCOOP AND SIFTER.

*The Schedule referred to in these Letters Patent and making part of the same.*

TO ALL WHOM IT MAY CONCERN:

Be it known that we, GEORGE W. SHERMAN and CHARLES L. SHERMAN, of Seymour, in the county of New Haven, and State of Connecticut, have invented a new and improved Combined Flour-Sifter and Scoop; and we do hereby declare that the following is a full, clear, and exact description thereof, which will enable those skilled in the art to make and use the same, reference being had to the accompanying drawings, forming part of this specification.

This invention of an improved article of domestic utility relates to a combined flour-sifter and scoop, by the use whereof the flour is taken up, the lumps broken, and the flour sifted through an appropriate sieve, which is set in the under side of the wall of the scoop. A bead upon the body of the scoop serves to measure the quantity of flour. The handle is set in a saddle upon the top of the scoop, the saddle also serving to strengthen the scoop and keep it in shape. In front of the scoop is a fixed lip, inclined upwards, to prevent the flour from falling out. At the rear is a standard forming a bearing for a crank-shaft, on which are set four arms, and branching off at the bottom so as to form two legs, serving to keep the scoop from rolling when laid out of hand. On one of the arms is a scraper for the purpose of cleaning the flour from the hinder part of the scoop. On each arm, and at right angles to it, is a paddle or scraper, whose plane is set at an angle to the inside of the scoop, and having its edge turned over and directed to the walls thereof.

The accompanying drawing is a perspective view of my combined flour-sifter and scoop.

A A is the body of the scoop, on which are one or more beads $a$, serving to measure the quantity of flour. B, a sieve set in the under side of the wall thereof. C is a handle set in the saddle D, upon the top of the scoop, serving to strengthen it and keep it in shape. E is a standard forming a support at $e\ e$, to steady the sieve, and a bearing for the crank-shaft F, on which is the crank $f$, by which the arms G G', and paddles H are operated. G G G G' are four arms set upon the shaft F, G' being provided with the scraper $g$, by which the flour is removed from the hinder part of the scoop. On each of the arms G G G G' is set, at right angles to it, a paddle or scraper, H, the plane whereof is inclined at an acute angle to the walls of the scoop, and the edge $h$ turned up towards the said walls. The paddles or scrapers H extend from the arms G G', at the rear of the sifter, to the end of the sieve, and serve to break the lumps and help to sift the flour through the sieve. In front of the scoop is the fixed lip L, inclined upwards to keep the flour from falling out.

We claim as new, and desire to secure by Letters Patent—

The combination of the scoop A, having beads $a$, handle C, saddle D, standard E, crank-shaft F, arms G G', paddles H, sifter B, and lip L, substantially as described for the purpose specified.

GEO. W. SHERMAN,
CHARLES L. SHERMAN.

Witnesses:
W. W. SMITH,
THEO. M. SWIFT.